United States Patent
Li et al.

(10) Patent No.: US 9,331,514 B2
(45) Date of Patent: May 3, 2016

(54) CHARGING APPARATUS

(71) Applicant: Huawei Technologies Co., Ltd., Shenzhen, Guangdong (CN)

(72) Inventors: Hui Li, Shenzhen (CN); Jianping Wang, Chengdu (CN); Yang Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 14/314,989

(22) Filed: Jun. 25, 2014

(65) Prior Publication Data

US 2014/0375250 A1 Dec. 25, 2014

(30) Foreign Application Priority Data

Jun. 25, 2013 (CN) .......................... 2013 1 0256067

(51) Int. Cl.
*H02J 7/00* (2006.01)

(52) U.S. Cl.
CPC ............. *H02J 7/0072* (2013.01); *H02J 7/0052* (2013.01)

(58) Field of Classification Search
CPC ...... H02J 7/0072; H02J 7/0052; H02J 7/0042
USPC ........................................................ 320/107
See application file for complete search history.

(56) References Cited

U.S. PATENT DOCUMENTS

| | | | |
|---|---|---|---|
| 2010/0231172 A1* | 9/2010 | Bastami | H02J 7/045 320/137 |
| 2013/0043828 A1* | 2/2013 | Gurlahosur | H02J 7/0081 320/107 |
| 2013/0043829 A1* | 2/2013 | Gurlahosur | H02J 7/045 320/107 |

FOREIGN PATENT DOCUMENTS

| | | |
|---|---|---|
| CN | 1595760 A | 3/2005 |
| CN | 201893592 U | 7/2011 |
| JP | 6197463 A | 7/1994 |
| WO | WO 2012019185 A2 | 2/2012 |

OTHER PUBLICATIONS

Lou, "Key Technology Research of modern integrated power management in portable devices," Thesis, pp. 1-129, Wanfang Data, Beijing, China (Jun. 10, 2011).

\* cited by examiner

*Primary Examiner* — Vuthe Siek
(74) *Attorney, Agent, or Firm* — Leydig, Voit & Mayer, Ltd.

(57) ABSTRACT

A charging apparatus is provided, and relatively high charging efficiency is still maintained when a charging current changes. The charging apparatus includes: a voltage regulator; a charging power tube, where a source electrode of the charging power tube is connected to an output end of the voltage regulator and a drain electrode of the charging power tube is connected to a positive electrode of a battery, and the charging power tube is configured to generate a charging current; a charging controller, where an output end of the charging controller is connected to a gate electrode of the charging power tube, and the charging controller is configured to control the charging power tube to adjust the charging current; and a reference voltage module, configured to obtain the charging current and a battery voltage and output a reference voltage.

10 Claims, 5 Drawing Sheets

CHARGING APPARATUS

CROSS-REFERENCE TO RELATED APPLICATIONS

This application claims priority to Chinese Patent Application No. 201310256067.7, filed on Jun. 25, 2013, which is hereby incorporated by reference in its entirety.

TECHNICAL FIELD

The present invention relates to the field of power supply technologies, and in particular, to a charging apparatus.

BACKGROUND

Figure 1:
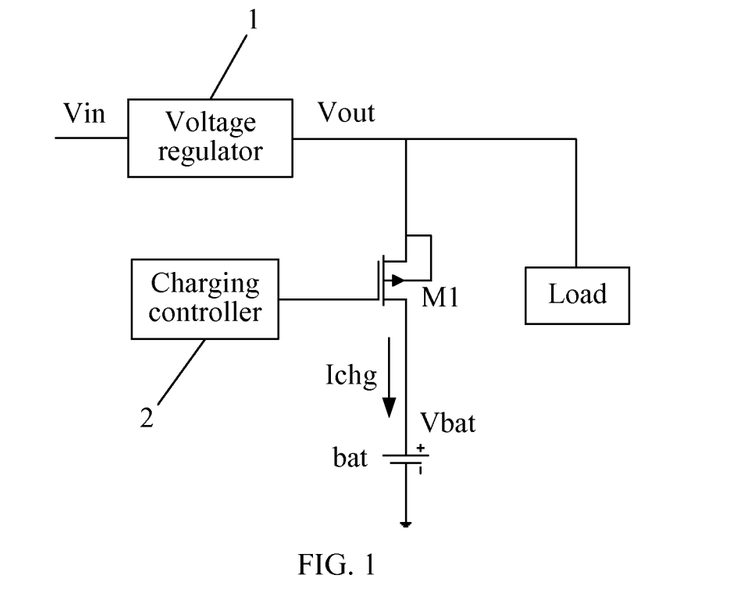
FIG. 1 is a structural block diagram of a charging apparatus in the prior art.
Figure 2:
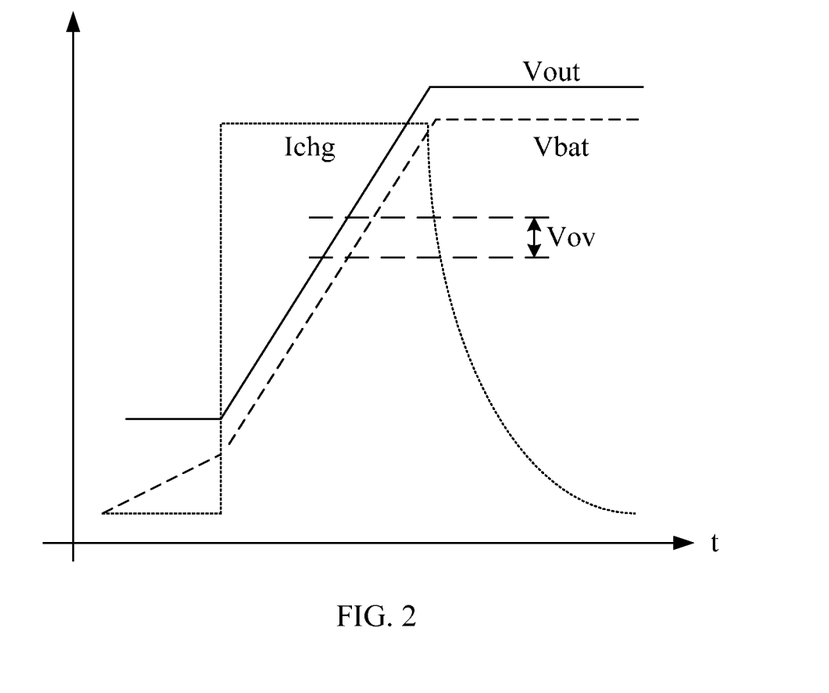
FIG. 2 is a schematic diagram of relationships among an output voltage, a battery voltage, and a charging current in a charging process of the charging apparatus shown in FIG. 1.

Currently, a large number of mobile terminals, such as mobile phones, tablets, or notebook computers, to which power is supplied by using batteries are applied in daily life of people. Charging and discharging control is generally performed on these devices by using a power path management architecture. As shown in FIG. 1, an existing charging apparatus includes a voltage regulator 1, a charging power tube M1, and a charging controller 2, where the voltage regulator 1 is configured to convert an input voltage Vin into an output voltage Vout, and the output voltage Vout generates, while supplying power to a load, a charging current Ichg by using the charging power tube M1, to charge a battery bat. As shown in FIG. 2, in order to increase charging efficiency, in an existing charging process, a fixed dropout is always maintained between an output voltage and a battery voltage, and Vov=Vout−Vbat, where Vbat is the battery voltage, Vov is a dropout between the output voltage Vout and the battery voltage Vbat, and a horizontal coordinate is time t. In the prior art, generally Vov is set to a fixed value, for example, in a charging process, Vov is maintained to be 200 mV; and in the charging process, Vout rises as Vbat rises. In this way, when the battery voltage is relatively low, relatively high charging efficiency can also be maintained. A minimum dropout between the output voltage Vout and the battery voltage Vbat is Vov−min=Rm1×Ichg, where Rm1 is conductive impedance of the charging power tube M1. The highest charging efficiency can be ensured only when Vov=Vov−min, that is, the dropout between the output voltage Vout and the battery voltage Vbat is maintained to be a minimum value. However, due to requirements of different application scenarios, usually the charging current Ichg is not a fixed value, and can be adjusted according to a register or an external resistor. Therefore, when Vov is set to a fixed value, relatively high charging efficiency cannot be maintained when a charging current changes.

SUMMARY

The present invention provides a charging apparatus, so that relatively high charging efficiency is still maintained when a charging current changes.

To solve the foregoing technical problem, the present invention adopts the following technical solutions:

A charging apparatus is provided, including:
a voltage regulator;
a charging power tube, where a source electrode of the charging power tube is connected to an output end of the voltage regulator and a drain electrode of the charging power tube is connected to a positive electrode of a battery, and the charging power tube is configured to generate a charging current;

a charging controller, where an output end of the charging controller is connected to a gate electrode of the charging power tube, and the charging controller is configured to control the charging power tube to adjust the charging current; and a reference voltage module, configured to obtain the charging current and a battery voltage and output a reference voltage, where the reference voltage is Rm1×Ichg+Vbat, where Rm1 is conductive impedance of the charging power tube, Ichg is the charging current, Vbat is the battery voltage, and an output end of the reference voltage module is connected to a reference voltage end of the voltage regulator.

Specifically, the reference voltage module includes:
a second transistor, where a gate electrode of the second transistor is connected to the gate electrode of the charging power tube and a source electrode of the second transistor is connected to the output end of the voltage regulator, and a ratio of a size of the charging power tube to a size of the second transistor is N:1, where N is an integer greater than 1;

a first operational amplifier, where a positive input end of the first operational amplifier is connected to the drain electrode of the charging power tube and a negative input end of the first operational amplifier is connected to a drain electrode of the second transistor;

a third transistor, where a gate electrode of the third transistor is connected to an output end of the first operational amplifier and a source electrode of the third transistor is connected to the drain electrode of the second transistor, and the first operational amplifier and the third transistor are configured to enable a drain voltage of the charging power tube and a drain voltage of the second transistor to be equal;

a fourth transistor, where a drain electrode of the fourth transistor is connected to a drain electrode of the third transistor, a source electrode of the fourth transistor is grounded, and a gate electrode of the fourth transistor is connected to the drain electrode of the fourth transistor;

a fifth transistor, where a gate electrode of the fifth transistor is connected to the gate electrode of the fourth transistor and a source electrode of the fifth transistor is grounded, and a ratio of a size of the fourth transistor to a size of the fifth transistor is 1:1;

a sixth transistor, where a gate electrode of the sixth transistor is connected to a drain electrode of the sixth transistor, a source electrode of the sixth transistor is connected to a power supply end, and the drain electrode of the sixth transistor is connected to a drain electrode of the fifth transistor;

a seventh transistor, where a gate electrode of the seventh transistor is connected to the gate electrode of the sixth transistor and a source electrode of the seventh transistor is connected to the power supply end, and a ratio of a size of the sixth transistor to a size of the seventh transistor is 1:1; and an eighth transistor, where a gate electrode of the eighth transistor is grounded, a source electrode of the eighth transistor is connected to a drain electrode of the seventh transistor and is used as the output end of the reference voltage module, a drain electrode of the eighth transistor is connected to the positive electrode of the battery, and a ratio of a size of the second transistor to a size of the eighth transistor is 1:1.

Specifically, the charging apparatus further includes:
a ninth transistor, where a gate electrode of the ninth transistor is connected to the gate electrode of the seventh transistor and a source electrode of the ninth transistor is connected to the power supply end, and a ratio of a size of the seventh transistor to a size of the ninth transistor is 1:1;

an adjustment resistor, where one end of the adjustment resistor is connected to a drain electrode of the ninth transistor and the other end of the adjustment resistor is grounded;

a first resistor, where one end of the first resistor is connected to the positive electrode of the battery and the other end of the first resistor is connected to a first node; and a second resistor, where one end of the second resistor is connected to the first node and the other end of the second resistor is grounded, and a voltage feedback end of the charging controller is connected to the first node, and a current feedback end of the charging controller is connected to the drain electrode of the ninth transistor.

Optionally, the charging apparatus further includes:

a bias current source, where one end of the bias current source is connected to the power supply end and the other end of the bias current source is connected to the source electrode of the eighth transistor.

Optionally, the voltage regulator includes:

a second operational amplifier, where a positive input end of the second operational amplifier is the reference voltage end of the voltage regulator;

a tenth transistor, where a gate electrode of the tenth transistor is connected to an output end of the second operational amplifier, a source electrode of the tenth transistor is connected to the power supply end, and a drain electrode of the tenth transistor is connected to a negative input end of the second operational amplifier;

a capacitor, where one end of the capacitor is connected to the gate electrode of the tenth transistor;

a third resistor, where one end of the third resistor is connected to the other end of the capacitor and the other end of the third resistor is connected to the drain electrode of the tenth transistor;

a fourth resistor, where one end of the fourth resistor is connected to the drain electrode of the tenth transistor and the other end of the fourth resistor is connected to a second node;

a fifth resistor, where one end of the fifth resistor is connected to the second node and the other end of the fifth resistor is grounded;

a third operational amplifier, where a positive input end of the third operational amplifier is connected to the second node;

a voltage converting module, where a first input end of the voltage converting module is an input end of the voltage regulator, a second input end of the voltage converting module is connected to an output end of the third operational amplifier, and an output end of the voltage converting module is the output end of the voltage regulator;

a sixth resistor, where one end of the sixth resistor is connected to the output end of the voltage converting module and the other end of the sixth resistor is connected to a negative input end of the third operational amplifier; and a seventh resistor, where one end of the seventh resistor is connected to the negative input end of the third operational amplifier and the other end of the seventh resistor is grounded, and $R5 \times (R6+R7) > R7 \times (R4+R5)$, where R4 is a resistance of the fourth resistor, R5 is a resistance of the fifth resistor, R6 is a resistance of the sixth resistor, and R7 is a resistance of the seventh resistor.

Specifically, the voltage regulator is a step-down switch voltage regulator or a low-dropout linear voltage regulator.

Preferably, N is an integer ranging from 1000 to 10000.

Specifically, the charging power tube, the second transistor, the third transistor, the sixth transistor, the seventh transistor, and the eighth transistor are P-type MOSFETs; and the fourth transistor and the fifth transistor are N-type MOSFETs.

Specifically, the ninth transistor is a P-type MOSFET.

Specifically, the tenth transistor is a P-type MOSFET.

According to the charging apparatus provided in the present invention, a reference voltage output unit is set, so that a reference voltage of a voltage regulator is $Rm1 \times Ichg+Vbat$, and a dropout between an output voltage and a battery voltage is always maintained to be a relatively low value; and therefore, relatively high charging efficiency is still maintained when a charging current Ichg changes.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 3:
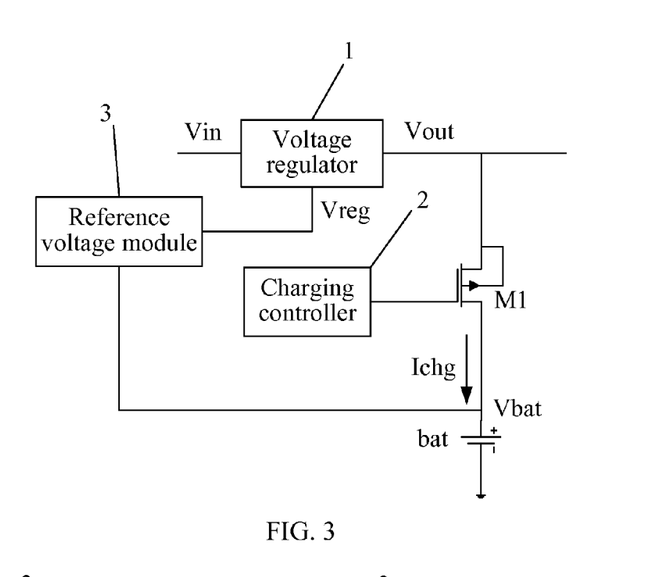
FIG. 3 is a structural block diagram of a charging apparatus according to Embodiment 1 of the present invention.

As shown in FIG. 3, an embodiment of the present invention provides a charging apparatus, including: a voltage regulator 1; a charging power tube M1, where a source electrode of the charging power tube M1 is connected to an output end of the voltage regulator 1 and a drain electrode of the charging power tube M1 is connected to a positive electrode of a battery bat, and the charging power tube M1 is configured to generate a charging current Ichg, where the charging current Ichg is a current that flows from the drain electrode of the charging power tube M1 to the battery bat; a charging controller 2, where an output end of the charging controller 2 is connected to a gate electrode of the charging power tube M1, and the charging controller 2 is configured to control the charging power tube M1 to adjust the charging current Ichg;

and a reference voltage module 3, configured to obtain the charging current and a battery voltage and output a reference voltage Vreg, where the reference voltage Vreg is Rm1× Ichg+Vbat, where Rm1 is conductive impedance of the charging power tube M1, Ichg is the charging current, Vbat is the battery voltage, and an output end of the reference voltage module 3 is connected to a reference voltage end of the voltage regulator 1.

Specifically, the voltage regulator 1 outputs an output voltage Vout that uses the reference voltage Vreg as a target value; for example, if the reference voltage Vreg=Rm1×Ichg+Vbat, Vout=Vreg=Rm1×Ichg+Vbat; and therefore, when the charging current Ichg changes, a dropout between the output voltage Vout and the battery voltage Vbat is always maintained to be a minimum value. The voltage regulator 1 may specifically be a step-down switch voltage regulator or a low-dropout linear voltage regulator.

It should be noted that, the foregoing charging apparatus may be used in an electronic product with a power path management architecture, and may also be used in USB interface charging and control, for example, used in an electronic product such as a mobile phone, a tablet, or a notebook computer.

According to the charging apparatus in the embodiment of the present invention, a reference voltage output unit is set, so that a reference voltage of a voltage regulator is Rm1×Ichg+Vbat, and a dropout between an output voltage and a battery voltage is always maintained to be a relatively low value; and therefore, relatively high charging efficiency is still maintained when a charging current Ichg changes.

Embodiment 2

Figure 4:
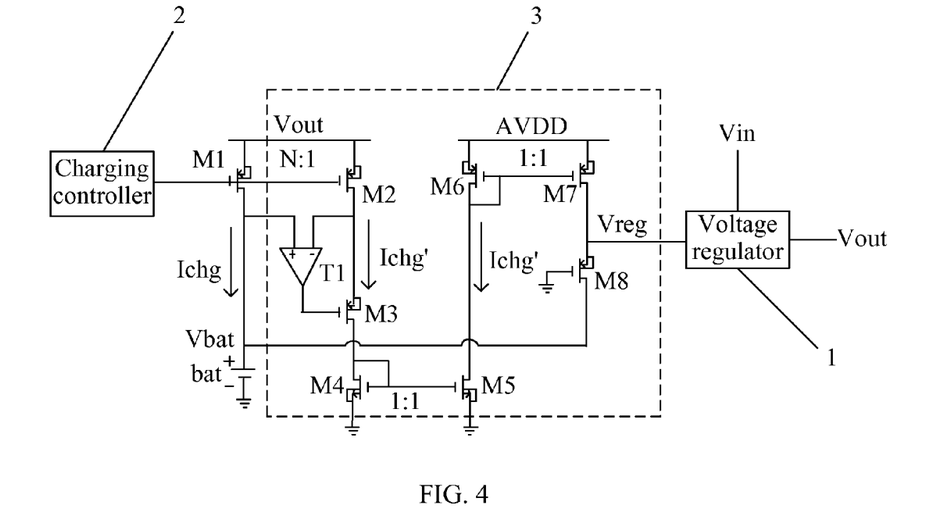
FIG. 4 is a schematic diagram of a circuit of a charging apparatus according to Embodiment 2 of the present invention.

As shown in FIG. 4, on the basis of Embodiment 1, the foregoing reference voltage module 3 may include: a second transistor M2, where a gate electrode of the second transistor M2 is connected to the gate electrode of the charging power tube M1 and a source electrode of the second transistor M2 is connected to the output end of the voltage regulator 1, and a ratio of a size of the charging power tube M1 to a size of the second transistor M2 is N:1, where N is an integer greater than 1, greater N indicates less power consumption of an entire circuit, and as a preferred solution, generally N may be set to an integer ranging from 1000 to 10000; a first operational amplifier T1, where a positive input end of the first operational amplifier T1 is connected to the drain electrode of the charging power tube M1 and a negative input end of the first operational amplifier T1 is connected to a drain electrode of the second transistor M2; a third transistor M3, where a gate electrode of the third transistor M3 is connected to an output end of the first operational amplifier T1 and a source electrode of the third transistor M3 is connected to the drain electrode of the second transistor M2, and the first operational amplifier T1 and the third transistor M3 are configured to enable a drain voltage of the charging power tube M1 and a drain voltage of the second transistor M2 to be equal; a fourth transistor M4, where a drain electrode of the fourth transistor M4 is connected to a drain electrode of the third transistor M3, a source electrode of the fourth transistor M4 is grounded, and a gate electrode of the fourth transistor M4 is connected to the drain electrode of the fourth transistor M4; a fifth transistor M5, where a gate electrode of the fifth transistor M5 is connected to the gate electrode of the fourth transistor M4 and a source electrode of the fifth transistor M5 is grounded, and a ratio of a size of the fourth transistor M4 to a size of the fifth transistor M5 is 1:1; a sixth transistor M6, where a gate electrode of the sixth transistor M6 is connected to a drain electrode of the sixth transistor M6, a source electrode of the sixth transistor M6 is connected to a power supply end, and the drain electrode of the sixth transistor M6 is connected to a drain electrode of the fifth transistor M5; a seventh transistor M7, where a gate electrode of the seventh transistor M7 is connected to the gate electrode of the sixth transistor M6 and a source electrode of the seventh transistor M7 is connected to a power supply end AVDD, and a ratio of a size of the sixth transistor M6 to a size of the seventh transistor M7 is 1:1; and an eighth transistor M8, where a gate electrode of the eighth transistor M8 is grounded, a source electrode of the eighth transistor M8 is connected to a drain electrode of the seventh transistor M7 and is connected, as the output end of the reference voltage module 3, to the reference voltage end of the voltage regulator 1, a drain electrode of the eighth transistor M8 is connected to the positive electrode of the battery bat, and a ratio of a size of the second transistor M2 to a size of the eighth transistor M8 is 1:1.

It should be noted that, the charging power tube M1 and the second to the eighth transistors M2 to M8 may all be Metal-Oxide-Semiconductor Field-Effect Transistor (MOSFET), where the charging power tube M1, the second transistor M2, the third transistor M3, the sixth transistor M6, the seventh transistor M7, and the eighth transistor M8 are P-type MOSFETs, and the fourth transistor M4 and the fifth transistor M5 are N-type MOSFETs.

Specifically, a size of a transistor refers to a width-to-length ratio of the transistor; for example, a ratio of a width-to-length ratio of the charging power tube M1 to a width-to-length ratio of the second transistor M2 is N:1, so that the second transistor M2 is a mirror that is 1/N times of the charging power tube M1, and therefore a current Ichg' that flows out of the drain electrode of the second transistor M2 is 1/N of the charging current Ichg. This current flows through the fourth transistor M4, but the fifth transistor M5 is a mirror of the fourth transistor M4, and therefore a current that flows through the fifth transistor M5 is also Ichg'. This current flows through the sixth transistor M6, but the seventh transistor M7 is a mirror of the sixth transistor M6, and therefore a current that flows through the seventh transistor M7 is also Ichg'. A ratio of a size of the eighth transistor M8 to a size of the charging power tube M1 is 1/N, and therefore Rm8=N×Rm1, where Rm1 is conductive impedance of the charging power tube M1, and Rm8 is conductive impedance of the eighth transistor M8. The current Ichg' flows through the eighth transistor M8, and therefore a reference voltage is:

$$Vreg=Rm8\times Ichg'+Vbat=N\times Rm1\times Ichg/N+Vbat=Rm1\times Ichg+Vbat$$

and an output voltage of the voltage regulator is Vout=Vreg=Rm1×Ichg+Vbat.

According to the charging apparatus in the embodiment of the present invention, a reference voltage output unit is set, so that a reference voltage of a voltage regulator is Rm1×Ichg+Vbat, and a dropout between an output voltage and a battery voltage is always maintained to be a relatively low value; and therefore, relatively high charging efficiency is still maintained when a charging current Ichg changes.

Embodiment 3

Figure 5:
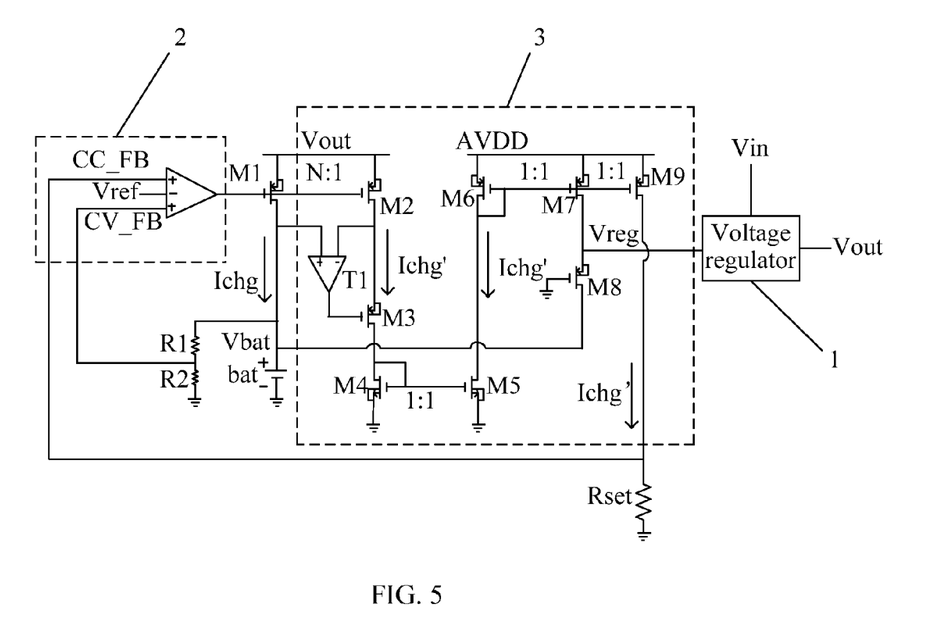
FIG. 5 is a schematic diagram of a circuit of a charging apparatus according to Embodiment 3 of the present invention.

As shown in FIG. 5, on the basis of Embodiment 2, the foregoing charging apparatus further includes: a ninth transistor M9, where a gate electrode of the ninth transistor M9 is connected to the gate electrode of the seventh transistor M7 and a source electrode of the ninth transistor M9 is connected to the power supply end AVDD, and a ratio of a size of the seventh transistor M7 to a size of the ninth transistor M9 is 1:1; an adjustment resistor Rset, where one end of the adjustment resistor Rset is connected to a drain electrode of the ninth transistor M9 and the other end of the adjustment resistor Rset is grounded; a first resistor R1, where one end of the first resistor R1 is connected to the positive electrode of the battery bat and the other end of the first resistor R1 is connected to a first node O1; and a second resistor R2, where one end of the second resistor R2 is connected to the first node O1 and the other end of the second resistor R2 is grounded, and a voltage feedback end CV_FB of the charging controller 2 is connected to the first node O1, and a current feedback end CC_FB of the charging controller 2 is connected to the drain electrode of the ninth transistor M9; and the charging controller 2 further includes a reference voltage end, configured to receive a reference voltage Vref.

Specifically, the ninth transistor M9 is a mirror of the seventh transistor M7, and therefore a current that flows through the ninth transistor M9 is also Ichg'. This current also flows through the adjustment resistor Rset. By setting a resistance of the adjustment resistor Rset, a voltage generated by the current Ichg' on the adjustment resistor Rset can be fed back to the current feedback end CC_FB of the charging controller 2, so as to adjust a charging current and implement constant-current charging. The first resistor R1 and the second resistor R2 are configured to divide and feed back the battery voltage Vbat to the voltage feedback end CV_FB of the charging controller 2, so as to adjust the charging current and implement the constant-voltage charging.

The ninth transistor M9 may be a P-type MOSFET. A specific structure and operating principle of the reference voltage module may be the same as those in the foregoing embodiments, and are not repeated herein.

According to the charging apparatus in the embodiment of the present invention, a reference voltage output unit is set, so that a reference voltage of a voltage regulator is Rm1×Ichg+Vbat, and a dropout between an output voltage and a battery voltage is always maintained to be a relatively low value; and therefore, relatively high charging efficiency is still maintained when a charging current Ichg changes.

Embodiment 4

Figure 6:
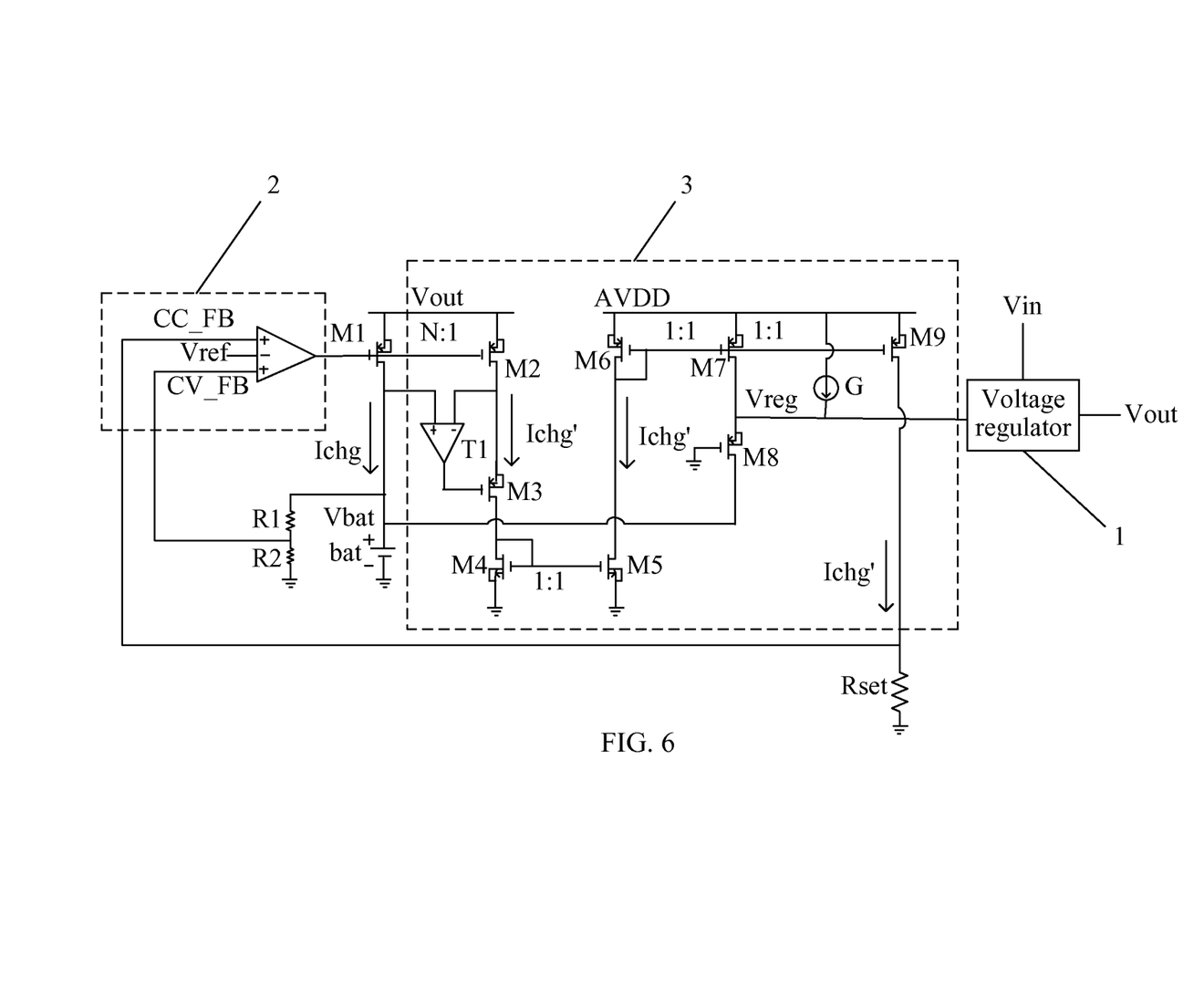
FIG. 6 is a schematic diagram of a circuit of a charging apparatus according to Embodiment 4 of the present invention.

As shown in FIG. 6, on the basis of Embodiment 2 or Embodiment 3, the foregoing charging apparatus may further include: a bias current source G, where one end of the bias current source G is connected to the power supply end AVDD and the other end of the bias current source G is connected to the source electrode of the eighth transistor M8, and the bias current source G is configured to provide a bias current Ib that flows through the eighth transistor M8.

Specifically, because a degeneracy point at which a charging current is 0 may occur on the charging apparatus in Embodiment 2 or Embodiment 3, that is, the charging current Ichg=0, the output voltage Vout of the voltage regulator is equal to the battery voltage Vbat. Because a dropout between the source electrode and the drain electrode of the charging power tube M1 is 0, the charging current is not generated, which causes that the entire charging apparatus enters a deadlock state, and charging is not started. However, in this embodiment, when the charging current Ichg is 0, the eighth transistor M8 adds a bias current Ib, and therefore Vreg=Vbat+Ib×Rm8=Vout. A bias is manually added, so that Vout>Vbat, and the entire circuit is started.

A specific structure and operating principle of the reference voltage module may be the same as those in Embodiment 2 or Embodiment 3, and the only difference lies in that, a bias current is added, and therefore an output voltage of the voltage regulator is:

$$Vout=Rm1\times Ichg+Rm8\times Ib+Vbat.$$

According to the charging apparatus in the embodiment of the present invention, a reference voltage output unit is set, so that a reference voltage of a voltage regulator is Rm1×Ichg+Vbat, and a dropout between an output voltage and a battery voltage is always maintained to be a relatively low value; and therefore, relatively high charging efficiency is still maintained when a charging current Ichg changes. Moreover, a deadlock state of the charging apparatus when the charging current is 0 is prevented.

Embodiment 5

Figure 7:
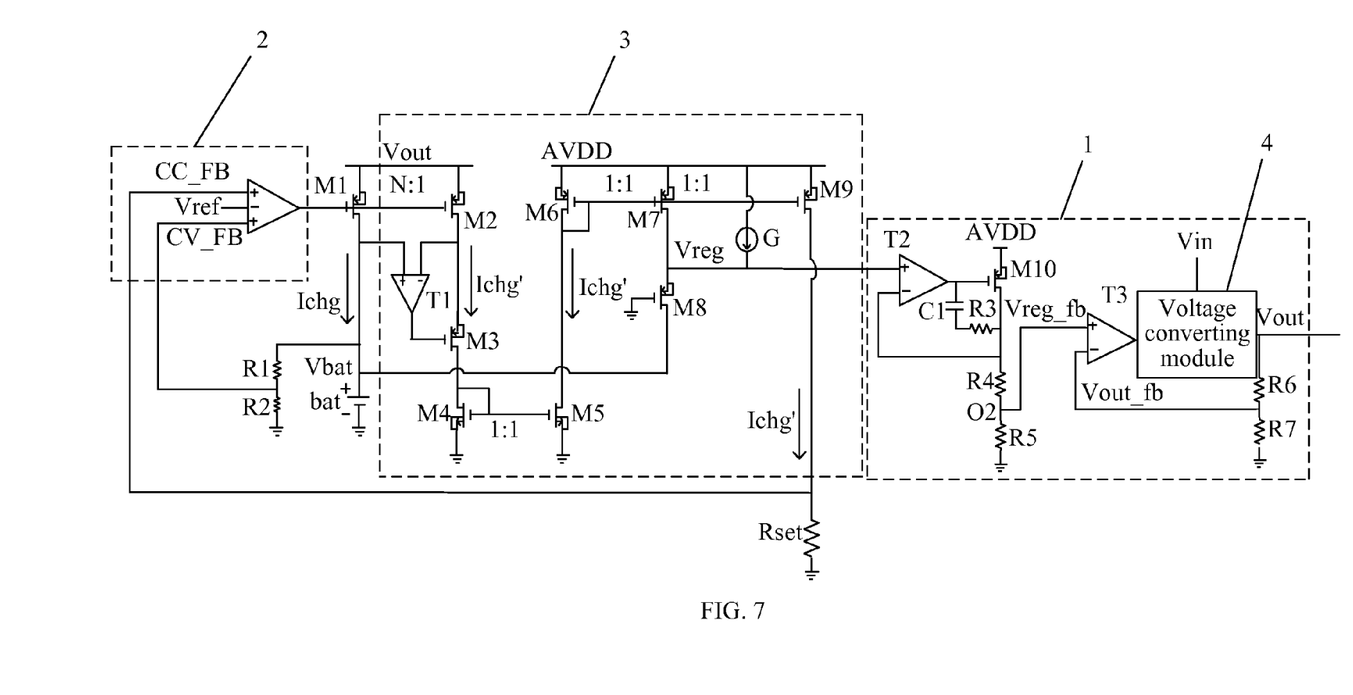
FIG. 7 is a schematic diagram of a circuit of a charging apparatus according to Embodiment 5 of the present invention.

As shown in FIG. 7, on the basis of Embodiment 2 or Embodiment 3, the foregoing voltage regulator 1 may include: a second operational amplifier T2, where a positive input end of the second operational amplifier T2 is the reference voltage end of the voltage regulator 1; a tenth transistor M10, where a gate electrode of the tenth transistor M10 is connected to an output end of the second operational amplifier T2, a source electrode of the tenth transistor M10 is connected to the power supply end AVDD, and a drain electrode of the tenth transistor M10 is connected to a negative input end of the second operational amplifier T2; a capacitor C1, where one end of the capacitor C1 is connected to the gate electrode of the tenth transistor M10; a third resistor R3, where one end of the third resistor R3 is connected to the other end of the capacitor C1 and the other end of the third resistor R3 is connected to the drain electrode of the tenth transistor M10; a fourth resistor R4, where one end of the fourth resistor R4 is connected to the drain electrode of the tenth transistor M10 and the other end of the fourth resistor R4 is connected to a second node O2; a fifth resistor R5, where one end of the fifth resistor R5 is connected to the second node O2 and the other end of the fifth resistor R5 is grounded; a third operational amplifier T3, where a positive input end of the third operational amplifier T3 is connected to the second node O2; a voltage converting module 4, where a first input end of the voltage converting module 4 is an input end of the voltage regulator 1, a second input end of the voltage converting module 4 is connected to an output end of the third operational amplifier T3, and an output end of the voltage converting module 4 is the output end of the voltage regulator 1; a sixth resistor R6, where one end of the sixth resistor R6 is connected to the output end of the voltage converting module 4 and the other end of the sixth resistor R6 is connected to a negative input end of the third operational amplifier T3; and a seventh resistor R7, where one end of the seventh resistor R7 is connected to the negative input end of the third operational amplifier T3 and the other end of the seventh resistor R7 is grounded, and R5×(R6+R7)>R7×(R4+R5), where in the formula, R4 is a resistance of the fourth resistor R4, R5 is a resistance of the fifth resistor R5, R6 is a resistance of the sixth resistor R6, and R7 is a resistance of the seventh resistor R7.

Specifically, a voltage of the positive input end of the third operational amplifier T3 is $$Vreg\_fb = \frac{R5}{R4+R5} \times Vreg,$$

and a voltage of the negative input end of the third operational amplifier T3 is $$\text{Vout\_fb} = \frac{R7}{R6+R7} \times Vout.$$

Vout_fb=Vreg_fb, that is, $$\frac{R5}{R4+R5} \times \left(Rm8 \times \frac{Ichg}{N} + Vbat\right) = \frac{R7}{R6+R7} \times Vout,$$

and R5×(R6+R7)>R7×(R4+R5), and therefore, when the charging current Ichg is 0, Vout>Vbat, so that the entire circuit is started.

The tenth transistor M10 may be a P-type MOSFET. A specific structure and operating principle of the reference voltage module may be the same as those in Embodiment 2 or Embodiment 3, and the only difference lies in that, a ratio of a feedback of an output end to a feedback of a reference voltage end of a voltage regulator is changed, and therefore an output voltage of the voltage regulator is:

$$Vout = \frac{R5(R6+R7)}{R7(R4+R5)} \times Vreg = \frac{R5(R6+R7)}{R7(R4+R5)} \times (Rm1 \times Ichg + Vbat).$$

According to the charging apparatus in the embodiment of the present invention, a reference voltage output unit is set, so that a reference voltage of a voltage regulator is Rm1×Ichg+Vbat, and a dropout between an output voltage and a battery voltage is always maintained to be a relatively low value; and therefore, relatively high charging efficiency is still maintained when a charging current Ichg changes. Moreover, a deadlock state of the charging apparatus when the charging current is 0 is prevented.

The foregoing descriptions are merely specific implementation manners of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A charging apparatus, comprising:
a voltage regulator;
a charging power tube, wherein a source electrode of the charging power tube is connected to an output end of the voltage regulator and a drain electrode of the charging power tube is connected to a positive electrode of a battery, and the charging power tube is configured to generate a charging current;
a charging controller, wherein an output end of the charging controller is connected to a gate electrode of the charging power tube, and the charging controller is configured to control the charging power tube to adjust the charging current; and
a reference voltage module, configured to obtain the charging current and a battery voltage and output a reference voltage, wherein the reference voltage is Rm1×Ichg+Vbat, wherein Rm1 is conductive impedance of the charging power tube, Ichg is the charging current, Vbat is the battery voltage, and an output end of the reference voltage module is connected to a reference voltage end of the voltage regulator.

2. The charging apparatus according to claim 1, wherein, the reference voltage module comprises:
a second transistor, wherein a gate electrode of the second transistor is connected to the gate electrode of the charging power tube and a source electrode of the second transistor is connected to the output end of the voltage regulator, and a ratio of a size of the charging power tube to a size of the second transistor is N:1, wherein N is an integer greater than 1;
a first operational amplifier, wherein a positive input end of the first operational amplifier is connected to the drain electrode of the charging power tube and a negative input end of the first operational amplifier is connected to a drain electrode of the second transistor;
a third transistor, wherein a gate electrode of the third transistor is connected to an output end of the first operational amplifier and a source electrode of the third transistor is connected to the drain electrode of the second transistor, and the first operational amplifier and the third transistor are configured to enable a drain voltage of the charging power tube and a drain voltage of the second transistor to be equal;
a fourth transistor, wherein a drain electrode of the fourth transistor is connected to a drain electrode of the third transistor, a source electrode of the fourth transistor is grounded, and a gate electrode of the fourth transistor is connected to the drain electrode of the fourth transistor;
a fifth transistor, wherein a gate electrode of the fifth transistor is connected to the gate electrode of the fourth transistor and a source electrode of the fifth transistor is grounded, and a size of the fourth transistor is equal to a size of the fifth transistor;
a sixth transistor, wherein a gate electrode of the sixth transistor is connected to a drain electrode of the sixth transistor, a source electrode of the sixth transistor is connected to a power supply end, and the drain electrode of the sixth transistor is connected to a drain electrode of the fifth transistor;
a seventh transistor, wherein a gate electrode of the seventh transistor is connected to the gate electrode of the sixth transistor and a source electrode of the seventh transistor is connected to the power supply end, and a size of the sixth transistor is equal to a size of the seventh transistor; and
an eighth transistor, wherein a gate electrode of the eighth transistor is grounded, a source electrode of the eighth transistor is connected to a drain electrode of the seventh transistor and is used as the output end of the reference voltage module, a drain electrode of the eighth transistor is connected to the positive electrode of the battery, and a size of the second transistor is equal to a size of the eighth transistor.

3. The charging apparatus according to claim 2, further comprising:
a ninth transistor, wherein a gate electrode of the ninth transistor is connected to the gate electrode of the seventh transistor and a source electrode of the ninth transistor is connected to the power supply end, and a size of the seventh transistor is equal to a size of the ninth transistor;
an adjustment resistor, wherein one end of the adjustment resistor is connected to a drain electrode of the ninth transistor and the other end of the adjustment resistor is grounded;

a first resistor, wherein one end of the first resistor is connected to the positive electrode of the battery and the other end of the first resistor is connected to a first node; and a second resistor, wherein one end of the second resistor is connected to the first node and the other end of the second resistor is grounded, and a voltage feedback end of the charging controller is connected to the first node, and a current feedback end of the charging controller is connected to the drain electrode of the ninth transistor.

4. The charging apparatus according to claim 3, wherein, the ninth transistor is a P-type Metal-Oxide-Semiconductor Field-Effect Transistor (MOSFET).

5. The charging apparatus according to claim 2, further comprising:

a bias current source, wherein one end of the bias current source is connected to the power supply end and the other end of the bias current source is connected to the source electrode of the eighth transistor.

6. The charging apparatus according to claim 2, wherein the voltage regulator comprises:

a second operational amplifier, wherein a positive input end of the second operational amplifier is the reference voltage end of the voltage regulator;

a tenth transistor, wherein a gate electrode of the tenth transistor is connected to an output end of the second operational amplifier, a source electrode of the tenth transistor is connected to the power supply end, and a drain electrode of the tenth transistor is connected to a negative input end of the second operational amplifier;

a capacitor, wherein one end of the capacitor is connected to the gate electrode of the tenth transistor;

a third resistor, wherein one end of the third resistor is connected to the other end of the capacitor and the other end of the third resistor is connected to the drain electrode of the tenth transistor;

a fourth resistor, wherein one end of the fourth resistor is connected to the drain electrode of the tenth transistor and the other end of the fourth resistor is connected to a second node;

a fifth resistor, wherein one end of the fifth resistor is connected to the second node and the other end of the fifth resistor is grounded;

a third operational amplifier, wherein a positive input end of the third operational amplifier is connected to the second node;

a voltage converting module, wherein a first input end of the voltage converting module is an input end of the voltage regulator, a second input end of the voltage converting module is connected to an output end of the third operational amplifier, and an output end of the voltage converting module is the output end of the voltage regulator;

a sixth resistor, wherein one end of the sixth resistor is connected to the output end of the voltage converting module and the other end of the sixth resistor is connected to a negative input end of the third operational amplifier; and a seventh resistor, wherein one end of the seventh resistor is connected to the negative input end of the third operational amplifier and the other end of the seventh resistor is grounded, and $R5 \times (R6+R7) > R7 \times (R4+R5)$, wherein R4 is a resistance of the fourth resistor, R5 is a resistance of the fifth resistor, R6 is a resistance of the sixth resistor, and R7 is a resistance of the seventh resistor.

7. The charging apparatus according to claim 6, wherein, the tenth transistor is a P-type Metal-Oxide-Semiconductor Field-Effect Transistor (MOSFET).

8. The charging apparatus according to claim 2, wherein, N is an integer ranging from 1000 to 10000.

9. The charging apparatus according to claim 2, wherein, the charging power tube, the second transistor, the third transistor, the sixth transistor, the seventh transistor, and the eighth transistor are P-type Metal-Oxide-Semiconductor Field-Effect Transistors (MOSFETs); and the fourth transistor and the fifth transistor are N-type MOSFETs.

10. The charging apparatus according to claim 1, wherein, the voltage regulator is a step-down switch voltage regulator or a low-dropout linear voltage regulator.

* * * * *